(12) United States Patent
Becher et al.

(10) Patent No.: US 7,984,074 B1
(45) Date of Patent: Jul. 19, 2011

(54) METHODS AND APPARATUS PROVIDING AN EXTENSIBLE MANAGEABLE ENTITY MODEL FOR A NETWORK

(75) Inventors: Andrew S. Becher, North Attleboro, MA (US); Serge G. Marokhovsky, Upton, MA (US); Shuzi Chen, Newton, MA (US); Sadasiva K. Prathab, Hopkinton, MA (US); Zakir G. Magdum, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 404 days.

(21) Appl. No.: 11/970,728

(22) Filed: Jan. 8, 2008

Related U.S. Application Data

(62) Division of application No. 10/335,546, filed on Dec. 31, 2002, now Pat. No. 7,454,487.

(51) Int. Cl.
*G06F 7/00* (2006.01)
*G06F 15/173* (2006.01)

(52) U.S. Cl. ........................ 707/802; 709/223

(58) Field of Classification Search .................. 707/802, 707/999.101; 709/223
See application file for complete search history.

(56) References Cited

U.S. PATENT DOCUMENTS

| | | | | |
|---|---|---|---|---|
| 6,557,100 B1 * | 4/2003 | Knutson | ........................ | 713/100 |
| 7,275,236 B1 * | 9/2007 | Kabe | ............................ | 717/106 |
| 2002/0078021 A1 * | 6/2002 | Lawton | ............................ | 707/1 |
| 2002/0161800 A1 * | 10/2002 | Eld et al. | ........................ | 707/512 |
| 2003/0009754 A1 * | 1/2003 | Rowley et al. | ................ | 717/177 |
| 2003/0154279 A1 * | 8/2003 | Aziz | .............................. | 709/225 |
| 2003/0220940 A1 * | 11/2003 | Futoransky et al. | ....... | 707/104.1 |
| 2004/0024854 A1 * | 2/2004 | Mandal | ......................... | 709/223 |

* cited by examiner

*Primary Examiner* — Kimberly Lovel
*Assistant Examiner* — Mohammed R Uddin
(74) *Attorney, Agent, or Firm* — Krishnendu Gupta; Gerald P. Kazanjian

(57) ABSTRACT

Deployment of new elements in a computer network can result in development of patch kits adapters, and other software and trigger corresponding regressive test efforts. In a storage area network, a method is disclosed for defining a general, extensible model of a manageable entity for use in management of the entity. The method includes obtaining a set of attribute values related to the manageable entity in relation to the storage area network. A deployment engine identifies corresponding entity categories within a storage area network entity model that contains attribute definitions that correspond to respective attribute values in the set of attribute values obtained from the manageable entity. The deployment engine assigns the respective attribute values of the manageable entity to the corresponding respective attribute definitions identified in the model. The deployment engine then determines if all attribute values of the manageable entity have been assigned. If unassigned attribute values remain, a classification processor defines new entity categories to contain new attribute definitions, and assigns the unassigned attributes value to the new attribute definitions contained in the new entity category.

18 Claims, 14 Drawing Sheets

METHODS AND APPARATUS PROVIDING AN EXTENSIBLE MANAGEABLE ENTITY MODEL FOR A NETWORK

CROSS REFERENCE TO RELATED APPLICATIONS

This Patent Application is a Divisional of U.S. patent application Ser. No. 10/335,546 filed on Dec. 31, 2002, entitled, "METHODS AND APPARATUS PROVIDING AN EXTENSIBLE MANAGEABLE ENTITY MODEL FOR A NETWORK," issued as U.S. Pat. No. 7,454,487 on Nov. 18, 2008, the contents and teachings of which are hereby incorporated by reference in their entirety.

BACKGROUND OF THE INVENTION

In a computer network, a network manager or operator often requires the ability to add or modify new or existing network elements such as switches, routers, hubs, servers, disks, and other devices. In addition, the network operator may require the ability to replace, add or upgrade new or existing software and firmware images that execute on or in conjunction with the network devices in the computer network. Often such modifications to network resources require that the network operator or another person develop additional drivers, modules, adapters, configuration files, and other hardware and software components to enable the new element to be deployed and managed correctly on the network. In a storage area network (SAN), conventional deployment of new elements such as storage area network devices or software applications additionally requires employment of linear, or manual software development techniques to properly develop or create software modules that correspond to and that can manage the new elements. As an example, suppose a network administrator purchases a new host computer system that includes a new operating system for deployment within a storage area network as a server. The network administrator will require the ability to manage this new host device in a remote capacity via use of a network management software application. To do so, the conventional network management software application requires creation, by the network manager or by a developer of the network management software application, custom versions of source, object, and executable code deliverables to support management of the new host device.

In a typical conventional storage area network, one or more storage arrays having very large amounts of data storage capacity are connected through connectivity devices, such as switches, to host computer systems that operate as servers of data to client computer systems that request the data from the storage arrays. The storage area network is thus a network that interconnects host, connectivity and storage elements in a storage environment and ensures fault-free and timely access to the data for client users via the host servers. In the storage area network, a conventional storage area network management application is employed to monitor and control (i.e., to manage) the host, connectivity and storage elements in the network. Management of the storage area network by the network management application allows optimal usage and throughput in the storage area network by identifying areas of contention, reporting malfunctions, providing access control, and allocating ports and data flow paths between the host and storage devices in the storage area network.

The conventional network management application employs software components executing on, within or in conjunction with the various elements in the storage environment to effect management of these elements within the storage area network. Typically, a repository such as a database operates in conjunction with the network management application in order to map the elements (e.g, devices and software processes) that comprise the storage area network environment into data structures that the network management application can use to manage the network elements. The repository typically includes respective element definitions for each manageable entity in the storage area network. Each element definition in the repository includes or defines information such as types and attributes (characteristics) and associated attribute values of the element, relationships between that element and other elements, as well as topology, diagnostic, and historical data concerning that storage area network element as it operates within the storage area network.

The network management application can access the repository to obtain, for example, the current state of an element in the storage area network, such as the current performance of a host server computer system, by querying its respective element definition. In addition, the network management application can access an element definition in the repository in order to initiate communication with the device corresponding to that element definition to manage that device. In this manner, the network management application manages the entities in the storage area network to monitor and control operation of the storage area network environment. Other software components such as agent components, server components, and repository components may operate on or in conjunction with certain elements in the storage area network and these other applications may be responsive management requests from the network management application.

SUMMARY

Conventional mechanisms and techniques that provide the ability to manage elements within a storage area network environment suffer from a variety of deficiencies. In particular, conventional deployment strategies used to integrate a new entity into a storage area network require creation and instantiation of management software components customized for that entity in order to monitor and control the deployed entity via the network management application. As an example, in a conventional storage area network, a network manager often adds, upgrades or removes devices or software such as storage arrays, connectivity devices, operating systems, hosts, zoning control programs, and/or other hardware and software entities to and from the storage area network. Conventional deployment techniques of a new entity typically require, for example, creation of a local software component executing in conjunction with the network management application in order to manage that new entity, as well as creation of an agent software component executing on or in conjunction with the newly deployed entity to communicate with the management application. These new software components must rely further on creation of a new set of element definitions for use by the repository component to store management and control and attribute information regarding the new entity within the repository.

Using conventional storage area network management techniques, a storage area network operator or engineer must manually develop these new software components and data structures based upon the known characteristics of the new entity that is to be added to the storage area network. The operator then integrates the newly created software components and attribute and element definitions for the new entity into the existing storage area network by updating the repository and other affected components. After this task, the storage area network management application can effectively communicate with the new entity to manage this entity remotely. Furthermore, conventional mechanisms and techniques to deploy a new entity in a storage area network often require regressive testing of the affected entities to verify their correct operation and compatibility with the newly created software and data structures that are used to manage the entity. Such testing may trigger downtime of the storage area network.

To further illustrate such deficiencies using an example, consider a typical example conventional deployment scenario in which the storage area network manager purchases a new entity, such as a storage array, and attempts to install the new storage array in the storage area network. A manufacturer of the storage array supplies, along with the storage array itself, a specification sheet or a configuration file that indicates specific attributes of that array. Such attributes can include, for example, a description of the physical characteristics of the storage array as well as software characteristics of the storage array such as a list of protocols that may be used to communicate with the storage array. Quite often, since the new storage array is different than other storage arrays already installed with the storage area network, the attributes of the new storage array will not correspond to the existing set of attribute and element definitions of the existing storage array entities. As a result, the storage area network manager is unable to manage the new storage array using the current existing configuration of the network management application. The storage area network manager thus may contact technical support of the manufacturer of the new storage array and may discover that the storage array type is not yet manageable by the current version called the network management application in use by that storage area network installation.

In order for the conventional network management application to support management of the new entity that the network operator integrates into the storage area network, the technical support organization of the network management application must obtained the attribute set of the new storage array. The storage area network manager must therefore wait for a new release of the network management application that accommodates management of the new entity.

The technical support or engineering group must map or create a set of new attribute definitions to accommodate management of the new entity. In other words, the engineering group must develop new data structures and software components that are able to use the new attributes of the new entity for management of this new device. For the storage array example discussed above, the technical support agency must develop new element definition data structures and software components for operation of agent software that executes on a host connected to the new storage array and for use by the network management application. The technical support group may further require the ability to update or modify the repository component to include the new attribute definitions developed for the storage array entity. Other components in communication with these entities may also be affected.

The engineering group then must assess and perform regressive testing of the modified components to ensure validity and proper operation. The engineering group then builds a patch or other installation kit from the modified components and emails or burns this new software release onto a CDROM or other suitable format, and sends this to the storage area network manager at the customer site. The storage area network manager then installs the patch and deploys the new storage array entity on the storage area network, which has been idle since delivery.

The conventional manual, or linear deployment and management development cycle described above for the addition of a new entity into a storage area network environment, therefore, tends to result in cumbersome installations, site-specific patches, and time consuming regressive testing. This is due in large part to the fact that data structures and other software components required to manage a newly created software entity or hardware device within a storage area network are crafted from scratch in conventional deployment situations. That is, there is little if any automated reuse of software components and/or preexisting data structures such as, for example, repository element definitions to maintain attribute values associated with newly developed storage area network entities. Even in development environments that use object-oriented software development techniques, conventional mechanisms for developing the software necessary to manage a newly created storage area network manageable resource do not automatically consider the reuse of existing resources. Accordingly, even if a technical support person who has the task of developing new software modules for a newly created storage area network entity happens to remember that an existing set of data structures may closely resemble some of the attributes used by the new entity, it is largely a manual effort to determine which data structures of an entire set of repository data structures may be effectively reused to hasten the deployment of management software for effective management of this new entity. In other words, current network management application development processes require that developers of the network management application recreate completely new sets of data structures to represent a new entity that is released by a manufacturer for use within a storage area network environment. Accordingly, effective time-to-market and downtime tends to be increased.

Embodiments of the invention significantly overcome the aforementioned deficiencies. In particular, embodiments of the invention provide an extensible and hierarchical object model for modeling and storing information related to manageable resources such as host devices, connectivity devices, storage devices and software entities (e.g., database programs, logical volume managers, operating systems or the like) within a storage area network. Using this extensible and hierarchical object model as will be explained in more detail, embodiments of the invention provide highly automated techniques and mechanisms for integrating new or different or upgraded manageable entities within a storage area network environment thus allowing more rapid deployment of management capabilities for such entities without the need extensive manual recreation of complete new sets of data structures and element definitions to represent the new entity, as is done using the aforementioned conventional techniques for providing management of storage area network entities.

Generally, embodiments of the invention are able to receive a set of attribute values or characteristics related to a manageable entity this to be deployed within a storage area network. Using this set of attribute values for this new entity, embodiments of the invention are able to compare attribute values within this set to existing attribute definitions defined within the current inventory of existing entity categories (e.g., managed objects defined in a repository) of an existing storage area network object entity model. The result of this comparison identifies any currently existing storage area network object model entity categories that can effectively be used to represent attribute values of the new entity. Accordingly, using this comparison technique, embodiments of the invention can identify a set of managed object data structures, taken from the existing set of hierarchical entity categories within an existing object model, to be used to closely (and in some cases exactly) represent the new entity. Any attribute values to do not match existing attribute definitions within existing entity categories in the existing object model comprise a remainder list of unmatched or unassigned attribute values. For these unassigned attribute values, embodiments of the invention allow the developer to define new entity categories containing entity definitions for the corresponding unassigned attribute values and then allow a developer to assign the unassigned attribute values to these newly defined entity categories. In this manner, embodiments of the invention significantly alleviate the need for a software developer to attempt to create an entire set of data structures to represent a new manageable entity.

Embodiments of the invention further avoid a developer from attempting to manually identify any potentially existing data structures within an object model that might be able to be used for representation of a new entity. Such conventional attempts are human-thought based and are highly cumbersome and prone to error. Instead, embodiments of the invention provide an automated attribute value to attribute definition comparison process to identify any pre-existing entity categories in a hierarchy that can be used to represent information related to componentry within the new entity. accordingly, identification of object model definitions (i.e., entity categories) is automated along with attribute value assignments for those matching attributes values to add to be definitions and those matching entity categories. For those unassigned or non-matching attribute values, the developer can further utilize embodiments of the invention to define new entity categories containing new attribute definitions that correspond to the unassigned or unmatched attribute values that are left over after the comparison process is complete. Embodiments of the invention thus significantly reduce development time of network management capabilities for a storage area network resource. Moreover, since the pre-existing hierarchical storage area network object model can contain an extensive library of existing entity categories having associated attribute definitions for various levels of details of manageable resources in a storage area network, it may be the case that the comparison process performed by embodiments of the invention completely matches all attribute values of the new entity to existing entity categories, thus effectively eliminating development time for data structures to represent the new entity.

More specifically, embodiments of the invention to provide mechanisms and techniques for defining manageable entities of a storage area network for use in management of a device corresponding to the defined mantle entities. One embodiment provides a method for defining a general, adaptive, extensible model of a manageable entity for use in management of the entity that expedites deployment of new manageable entities, such as storage arrays, connectivity devices, hosts, and databases, into the storage area network. The method embodiment includes obtaining a set of attribute values related to the new manageable entity in relation to the storage area network. A deployment engine identifies corresponding entity categories within a storage area network entity model (model) that contains attribute definitions that correspond to respective attribute values in the set of attribute values obtained from the manageable entity. The deployment engine assigns the respective attribute values of the manageable entity to the corresponding respective attribute definitions contained within the corresponding entity categories identified in the network entity model. The deployment engine then determines if all attribute values of the manageable entity have been assigned to the modeled attribute definitions, or if there is at least one unassigned attribute value in the set of attribute values related to the manageable entity. If unassigned attribute values remain, a classification processor defines new entity categories to contain the new attribute definitions that correspond to the unassigned attribute values, and assigns the unassigned attributes value to a corresponding one of the new attribute definitions contained in the new entity category.

In a particular configuration, the categories of the entity model are arranged in hierarchical levels, and the model is traversed by repeating the identifying and assigning in an iterative manner for entity categories at successive levels of the model. A classification processor is invoked for creating and storing new categories and attribute definitions for each of the unassigned attribute values.

The attribute values may be parsed, from an element specification file corresponding to the manageable entity, as attribute value pairs indicative of the attribute definition and corresponding attribute value. The attribute value pairs may further be indicative of the corresponding entity category.

For each new entity category, a corresponding component is created, or instantiated. The new entity categories may correspond to either hardware storage area network devices, such as a storage array, a host, or a connectivity device, or may be software entities such as operating systems, volume managers, file systems, and zones. For each of the defined manageable entities in the storage area network entity model, relations between categories, and attribute definitions within the categories, are defined by the entity model. The relations ensure neither consistency when new entities are added so that the existing model need not be upgraded nor any components corresponding to unchanged categories recompiled, rebuilt, or reconfigured. Therefore, new entities are integrated by manipulating only the categories that are new or changed, such that other unaffected categories and corresponding components and entities continue to operate without upgrade, rebuild, or other modifications.

In another particular configuration, the entity model is adapted for deployment of a storage array. A category is designated to correspond to each type of storage array, typically a particular model from a particular vendor. The deployment engine instantiates agent components to execute on the host for each storage array. The classification processor creates new categories for new types of storage arrays, and new agent components are deployed to correspond to the new category.

In another particular configuration, the entity model is adapted for deployment of a storage area network host. In this configuration, the deployment engine identifies a set of host devices in communication with the host, and identifies vendor specific attributes of the host devices. Employing the entity model, the deployment engine identifies relations between the new host and the host devices. If a new entity category is defined, the classification processor verifies the relations according to the entity model.

In another particular configuration, the entity model is adapted for deployment of a database in a storage area network. The deployment engine identifies files on physical devices corresponding to each of the identified entity categories in the database. If there are new attributes, the classification processor receives the new attributes and creates the corresponding entity categories. The deployment engine determines physical partitions, extents, and segments indicative of at least a portion of each of the identified files. The classification processor verifies relations between the physical partitions, extents, and segments for compliance with the entity model.

In this manner, components corresponding to new entities are rapidly deployed in the storage area network if the new entities are adaptable to the storage area network entity model. In this scenario, the deployment engine deploys instantiations of components corresponding to existing categories, thereby minimizing or eliminating regressive testing. Further, if additional attribute values are defined for the new entity, the classification processor defines additional categories and only new components corresponding to the additional categories are developed.

Other embodiments of the invention include a computerized device, such as a network management computerized device, workstation or other computerized device configured to process all of the aforementioned method operations disclosed herein as embodiments of the invention to provide a network topology view and associated resource management operations. In such embodiments, the computerized device includes a display, a memory system, a processor and an interconnection mechanism connecting the display, the processor and the memory system. The memory system is encoded with an entity management application that when performed on the processor, produces an entity management processes that operates as explained herein.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides a entity manager that performs associated operations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers can also provide the system of the invention.

It is to be understood that the system of the invention can be embodied strictly as a software program, as software and hardware, or as hardware alone. Example embodiments of the invention may be implemented within EMC's Control Center software application that provides management functionality for storage area network resources and in computerized devices that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
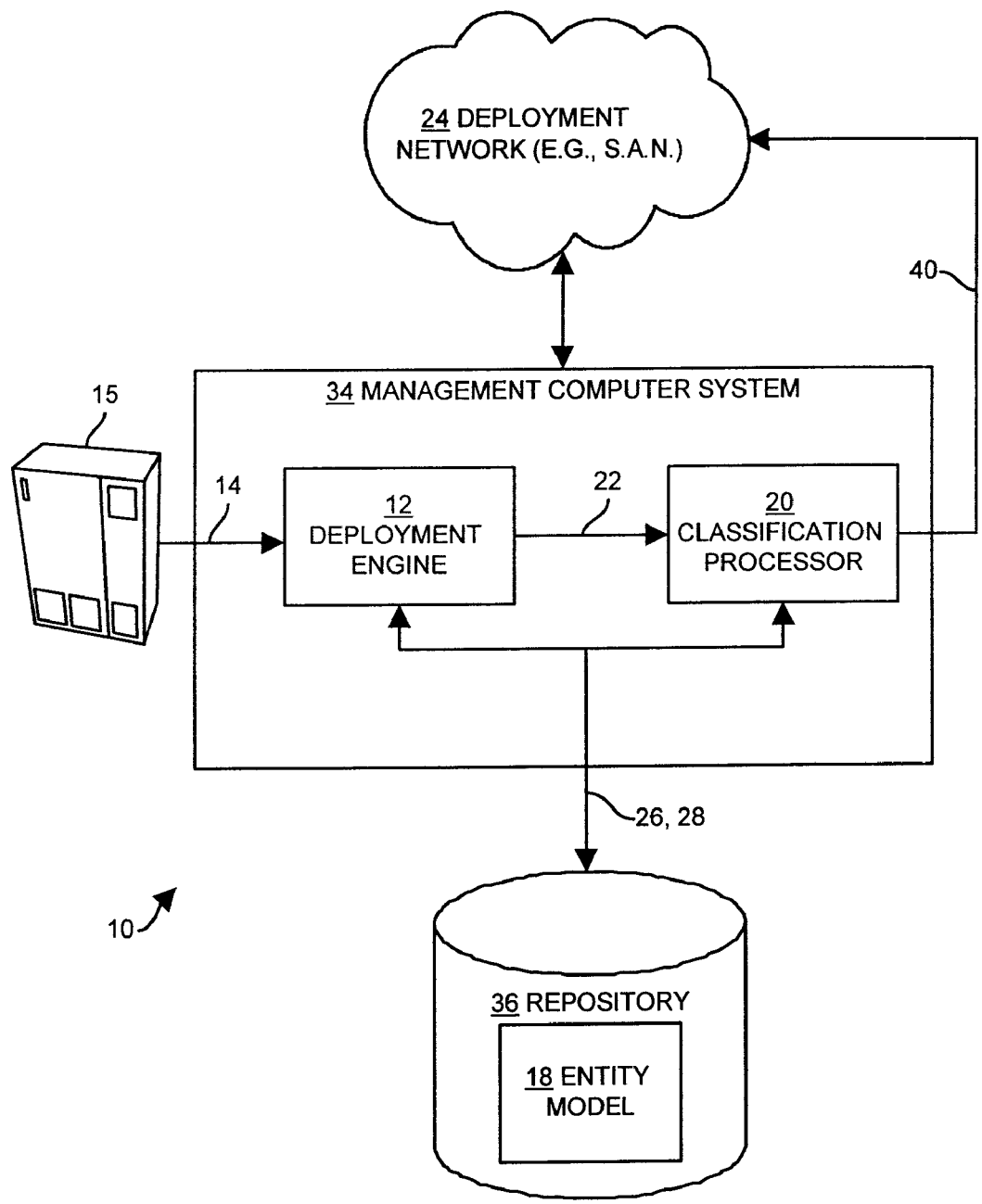
FIG. 1 is a block diagram of the invention in accordance with one embodiment of the invention.

Embodiments of the invention provide an extensible and hierarchical object model for modeling and storing information related to manageable resources such as host devices, connectivity devices, storage devices and software entities (e.g., database programs, logical volume managers, operating systems or the like) within a storage area network. Using this extensible and hierarchical object model as will be explained in more detail, embodiments of the invention provide highly automated techniques and mechanisms for integrating new or different or upgraded manageable entities within a storage area network environment thus allowing more rapid deployment of management capabilities for such entities without the need extensive manual recreation of complete new sets of data structures and element definitions to represent the new entity, as is done using the aforementioned conventional techniques for providing management of storage area network entities.

Generally, embodiments of the invention are able to receive a set of attribute values or characteristics related to a manageable entity this to be deployed within a storage area network. Using this set of attribute values for this new entity, embodiments of the invention are able to compare attribute values within this set to existing attribute definitions defined within the current inventory of existing entity categories (e.g., managed objects defined in a repository) of an existing storage area network object entity model. The result of this comparison identifies any currently existing storage area network object model entity categories that can effectively be used to represent attribute values of the new entity. Accordingly, using this comparison technique, embodiments of the invention can identify a set of managed object data structures, taken from the existing set of hierarchical entity categories within an existing object model, to be used to closely (and in some cases exactly) represent the new entity. Any attribute values to do not match existing attribute definitions within existing entity categories in the existing object model comprise a remainder list of unmatched or unassigned attribute values. For these unassigned attribute values, embodiments of the invention allow the developer to define new entity categories containing entity definitions for the corresponding unassigned attribute values and then allow a developer to assign the unassigned attribute values to these newly defined entity categories. In this manner, embodiments of the invention significantly alleviate the need for a software developer to attempt to create an entire set of data structures to represent a new manageable entity.

Embodiments of the invention further avoid a developer from attempting to manually identify any potentially existing data structures within an object model that might be able to be used for representation of a new entity. Such conventional attempts are human-thought based and are highly cumbersome and prone to error. Instead, embodiments of the invention provide an automated attribute value to attribute definition comparison process to identify any pre-existing entity categories in a hierarchy that can be used to represent information related to componentry within the new entity. Accordingly, identification of object model definitions (i.e., entity categories) is automated along with attribute value assignments for those matching attributes values to add to be definitions and those matching entity categories. For those unassigned or non-matching attribute values, the developer can further utilize embodiments of the invention to define new entity categories containing new attribute definitions that correspond to the unassigned or unmatched attribute values that are left over after the comparison process is complete. Embodiments of the invention thus significantly reduce development time of network management capabilities for a storage area network resource. Moreover, since the pre-existing hierarchical storage area network object model can contain an extensive library of existing entity categories having associated attribute definitions for various levels of details of manageable resources in a storage area network, it may be the case that the comparison process performed by embodiments of the invention completely matches all attribute values of the new entity to existing entity categories, thus effectively eliminating development time for data structures to represent the new entity.

As a brief example of operation of embodiments of the invention, consider a scenario in which a manufacturer releases a new version or a new type of host computer system that contains a new operating system. Certain aspects or attributes of the new host computer system may be common to other pre-existing host computer systems. As an example, at the highest level, the host computer system is just that, a host, and includes typical host attributes common to all host computer systems in a storage area network. Examples of common host attributes may be processor type, amount of memory, a number and type of data communications interfaces and so forth. In addition, other attribute values associated with this new host computer system may describe new features of the host that do not exist on other hosts with the storage area network. As an example, new attributes may be parameters describing the new operating system and its capabilities and characteristics that may be different from other operating systems of other (i.e., currently existing and modeled) host computer systems.

Now consider a vendor of a network management software application that learns of the creation of this new host computer system and desires to rapidly equip its storage area network management application with the ability to manage this host computer system remotely. Using embodiments of the invention, the vendor of the network management application will have, in its possession, an existing object model that includes hierarchically defined entity categories having associated attribute definitions for the various types of components that currently are manageable within a storage area network. In particular, the storage area network object model provided by embodiments of the invention may include, for example, top-level entity categories that define hardware devices that may exist within a storage area network such as hosts, storage devices, connectivity devices and the like. One top-level entity category may correspond to a generic host and may contain various attribute definitions that generically describe all hosts, such as the host vendor name of the host, a hostname for the host on the network, the host serial number and possibly other generic attributes.

Furthermore, within the object model provided by embodiments of the invention, under the top-level host entity category may be other entity categories that hierarchically related to the top-level host entity category and that define specific attribute definitions associated with specific components that typically exist within host devices currently under management of the storage area network management software. As an example, below the top-level host entity category may be respective entity categories that define attribute definitions for such things as internal or coupled host devices (e.g., disk drives, local printers and the like), software applications that execute on a host, interface types that may exist within the host, and so forth. The object model defined by embodiments of the invention provides a hierarchical breakdown of the various top-level entities into many related sub-entity categories at increasing levels of detail.

Accordingly, to provide management capability to the newly released host entity, the developer of the network management application can operate embodiments of the invention to obtain attribute values related to the new host entity. Embodiments of the invention can then identify corresponding entity categories within the existing storage area network entity object model that contain attribute definitions that correspond to respective attributes values in a set of attribute values for the new host entity. Embodiments of the invention can further assign the attribute values to the entry definitions for the matching entity categories. Any leftover attribute values that were not matched using the aforementioned processing describe those attributes of the new host entity that did not match the existing object model entity categories. As an example, since the operating system of the host was new, there may have been no existing entity category corresponding to this new type of operating system and there likewise may or may not be existing entity categories in the existing object model that define attribute definitions for certain aspects of the operating system. Embodiments of the invention can operate to determine these unassigned attribute values and can allow the user to define new entity categories containing new attribute definitions corresponding to the unassigned attribute values and can allow the user to assign the unassigned attribute values to the new attribute definitions. In this manner, embodiments of the invention reduce the amount of effort required by the developer to create data structures required by the network management application to allow this application to manage the new host entity.

While the example provided above explains high-level operation of an brief example embodiment of the invention with respect to the addition of a new host entity, is to be understood that embodiments of the invention provide such object model matching techniques for many different types a storage area network entities such as hardware devices including hosts, connectivity devices, and storage devices and other devices such as logical volume managers, database applications, zoning software applications, and so forth. Further details of operation of embodiments of the invention will not be described with respect to the Figures.

FIG. 1 shows a block diagram of the invention in accordance with one embodiment of the invention. Referring to FIG. 1, the manageable entity deployment system 10 includes a deployment engine 12, an entity model 18 (e.g., an object model) and a classification processor 20 that can access a repository 36. The deployment engine 12 and the classification processor 20 may be software processor (e.g., applications that may be executed by a processor to create a process), hardware devices (e.g., circuitry) or any combination thereof. It is to be understood that the deployment engine 12 and the classification processor 20 may operate as a single entity (e.g., may be part of a single software application) or may operate independently of each other.

Generally, in operation, the deployment engine 12 receives a set of attribute values, shown by arrow 14, from or for (i.e., associated with) a manageable entity 15 to be deployed within a network such as a storage area network. A manageable entity 15 can include hardware and/or software elements that may be deployed and managed as resources in the storage area network, as will be described further below. Examples of manageable entities 15 include new or updated version of database software, logical volume managers, data storage systems, host computer systems (e.g., servers), adapters, connectivity devices (e.g., fiber channel switches), and the like. The entity model 18 includes entity categories (e.g., managed objects, as will be explained), each having attribute definitions and relations to other categories, both described further below. Generally, the entity model 18 is a database model having managed object data structures (i.e., entity categories) that relate to each manageable entity 15 within a storage area network. The repository 36 stores the entity model 18. The deployment engine 12 operates to receive the set of attribute values 14 and can access the entity model 18. The deployment engine 12 attempts to assign the attribute values 14 to corresponding attribute definitions of existing entity categories (e.g, existing managed objects) in the entity model 18. The deployment engine 12 can also generates software interfaces 40 for use by components (e.g., software interfaces to managed objects) corresponding to entity categories for use in deployment of the new devices on the storage area network 24.

Also according to embodiments of the invention, the classification processor 20 operates to receive any unassigned attribute values, shown by arrow 22, from the deployment engine 12. Unassigned attribute values 22 are those attributes that did not have corresponding attribute definitions with existing entity categories within the entity model 18, as determined by the deployment engine 12. The classification processor 20 also has access to the entity model 18 and the current instantiations of manageable entities from the repository database 36. The classification processor 20 determines, for each of the unassigned attribute values 22, a category (i.e., an existing or a new category) and a new attribute definition to represent these unassigned attributes. A new attribute definition is created, and the classification processor 20 determines whether to store the new attribute definition in an existing category or to create a new category for this (and possibly other) unassigned attribute values. The classification processor 20 then creates a new category, if needed, and stores the new attribute definition and corresponding attribute value (i.e., the formerly unassigned attribute value) within the entity model 18.

The classification processor updates the entity model 18 with the new attribute definition 26 and its corresponding category and writes an indication of the deployment of a new manageable entity into the repository 36, shown by arrow 28. The classification processor 20 then makes available software interfaces 40 such as database query interfaces to the new entity categories in the entity model 18 containing new attribute definitions reflecting the new manageable entity 15 for management of this entity 15 in the deployment network 24.

Figure 2:
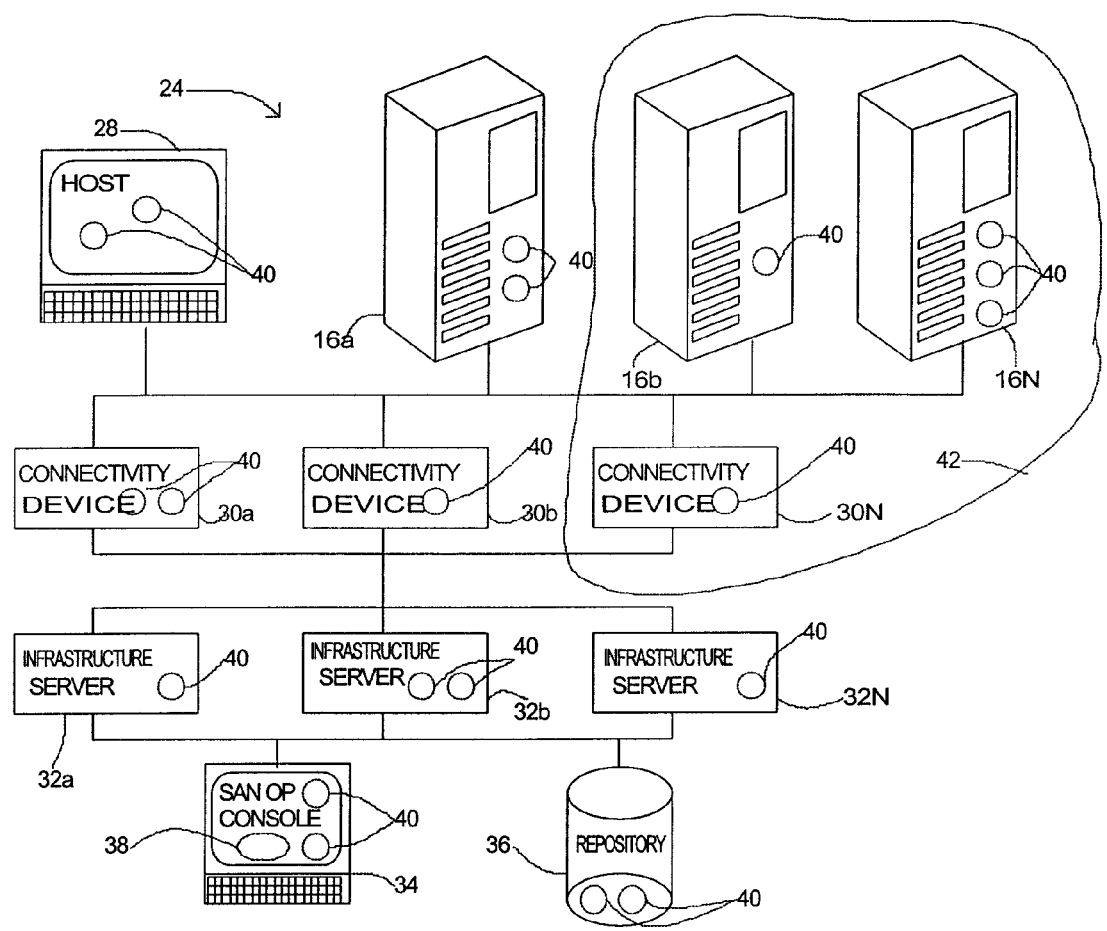
FIG. 2 is a block diagram of a storage area network (storage area network) suitable for use with the invention in accordance with one embodiment of the invention.

FIG. 2 is a block diagram of a storage area network 24 suitable for use in explaining example operations of embodiments of invention. Referring to FIG. 2, a bank of storage arrays 16a-16N (16n generally) store data for access by a host 28. A plurality of connectivity devices 30a-30N (30n generally), typically switches and routers, are connected to the storage arrays for routing data sent and received from the host 28. A storage area network 24 operator console 34 executes a network management application 38 for monitoring the storage area network 24. The operator console 34 allows management of manageable entities on the storage area network 24 as defined herein via the network management application 38. In a particular configuration the network management application 38 is an EMC storage area network management application called "Control Center", marketed commercially by EMC Corporation of Hopkinton, Mass. and disclosed in U.S. patent application Ser. No. 10/186,250, filed Jun. 27, 2002, entitled "Methods and Apparatus for Managing Devices Within Storage Area Networks," incorporated herein by reference in its entirety.

The network management application 38 provides monitoring and control of the manageable entities 15, such as by identifying areas of contention, reporting malfunctions, monitoring performance, providing access control, allocating ports, storage and flow paths and so forth. A plurality of infrastructure servers 32a-32N (32n generally) is in communication with the operator console 34 and the connectivity devices 30a-30N for gathering, reporting, and transmitting commands between the servers 32a-32N and the operator console 34. A host 28 gathers requests for data access to the storage arrays 16n on behalf of users. It should be noted that the hosts 28, storage arrays 16a-16N, connectivity devices 30a-30N, infrastructure servers 32a-32N, and operator console 34 are shown as exemplary in number, and a suitable quantity of such entities may be employed in alternate configurations depending on available resources.

A data repository 36 stores the entity model 18, the attribute values and corresponding attribute definitions of the manageable entities 15 defined in the storage area network 24 (FIG. 1). As indicated, these attributes are arranged in entity categories and are indicative of the type, characteristics, and relationships of the manageable entities. Note that the repository 36 stores the data specific to the manageable entities that operate within the storage area network 24, and does not typically store user accessible data stored on the storage arrays 16n for access via the host 28 and end user applications executing on the host. In other words, the repository 36 is used to store a persistent version of the entity model 18, such as in a database, and is used for management purposes of the manageable entities 15.

A manageable entity 15 typically has one or more management components (e.g., software or hardware) executing on it or in conjunction with the entity 15. A management component is a discrete software or hardware object, such as a management agent, which interacts with the manageable entity 15 for the purpose of managing that entity 15 from the network management application 38. A management component may be a process started by an executable file, such as a Java® script or applet, a data file written or read by a process, or other objects or agents or an application programming interface to operate a remote management program. Typically a management component can access, using software interfaces 40, the various entity category existing within the entity model 18. Management components such as agent use the software interfaces 40 provided by embodiments of the invention to perform various operations concerned with interaction with another manageable entities, and with the network management application 38.

As an example, agent components executing on the host 28 may use software interfaces 40 to gather information about attributes and categories for population of data structures within the repository 36. Server components executing on the infrastructure servers 32n gather information pertaining to throughput and access at a connectivity device 30n or gather information about the storage devices 16 and may use the software interfaces 40 to store this data into managed object data structures create by embodiments of this invention. The storage device 16 may also operate management components of their own as well that may use software interfaces 40 to store and access management data in the repository. Database components may operate in the repository 36 and may use software interfaces 40 to define and enforce relationships between categories of the entity model 18. Embodiments of the invention are able to produce entity model interface definitions 40 for use by various management components to allow the components to access database objects such as tables that are created based on operation of embodiments of the invention.

Figure 3:
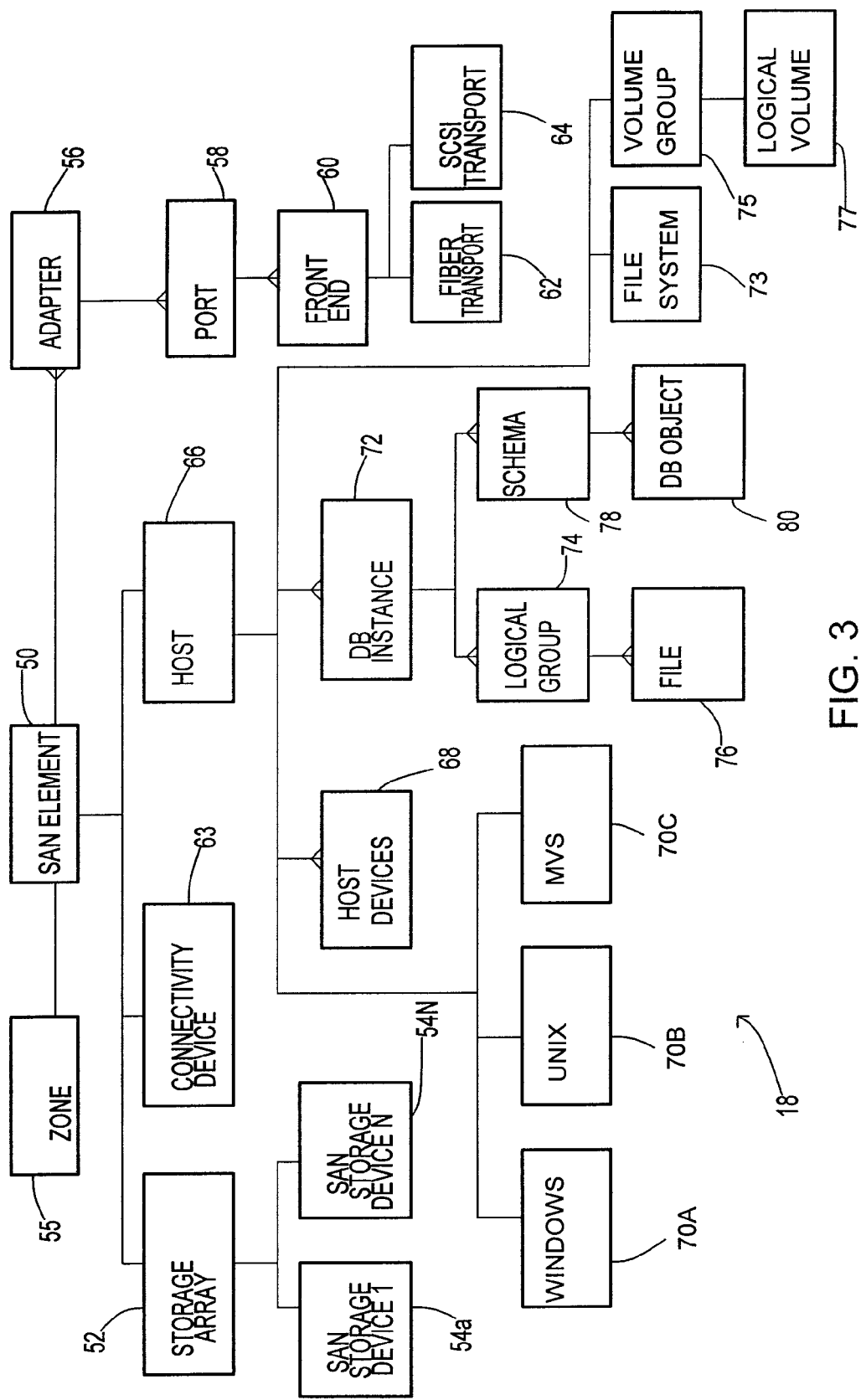
FIG. 3 shows a top level of the storage area network entity model including the categories of entity attributes in accordance with one embodiment of the invention.

FIG. 3 illustrates an example of a storage area network entity model 18 including the hierarchical categories of entity attributes in accordance with one example embodiment of the invention. Additional categories at alternate levels may be employed or defined, as will be shown further below with respect to FIGS. 12-14. The included attributes are disclosed in further detail below. Referring to FIGS. 1, 2 and 3, the relations between corresponding categories are shown. In a particular configuration, the entity model 18 is used to deploy new storage arrays, hosts, and databases within a storage area network and is further used by management applications 38 to derive a set of database objects, such as tables, files or other data structures, that represent the managed entities 15 so that, during runtime of the management application 38, this application 38 can store management data related to the managed entities 15.

By way of example, suppose a new storage array 16 is to be added to the storage area network 24. In this invention, the deployment engine 12 receives a set of attribute values 24 (FIG. 1) concerning or related to the storage array 16n. The attribute values 24 for the new storage array 16 indicate certain attribute value properties of the new storage array paired, for example, with attribute value names (e.g., name/value pairs). As a specific example, an attribute value appearing as "Disk_Count=80" may indicate how many disks (80 in this example) are in this new storage array. Other attribute values (name value pairs) may indicate the storage array vendor, serial number, its volume management techniques, configuration, and potentially many other details. In this example, each attribute value is actually a name "Disk_Count" followed by a corresponding value "80" for that name.

Directing attention to the entity model 18 in FIG. 3, this model 18 includes a top-level category for storage area network elements 50 (used to store attribute values common to all storage area network elements such as hosts, storage arrays and connectivity devices) and further includes a sub-category or subtype for storage array 52. The storage array category 52 further includes subtype categories corresponding to vendor-specific types of storage arrays 54a-54N. In a particular arrangement, the storage array subtypes include Symmetrix®, CLARiiON®, or Celerra™ storage arrays, that correspond to different types of storage array manufactured by EMC Corporation of Hopkinton, Mass. Alternatively, other sub-categories corresponding to storage arrays made by other vendors are defined in the entity model 18, enabling deployment of a heterogeneous mix of storage arrays 16 in the same storage area network 24 under the same network management application 38.

Further, each storage area network element 50 defined in the entity model 18 can have one or more adapters, defined by the adapter category 56. An adapter in a device can have one or more physical ports that may be defined by the physical ports category 58, as shown by the fan out symbol leading into the categories 56 and 58. Each port category 58 includes, in this example, a front-end category 68 to maintain attribute values related to front-end adapter connections to a host. The front end category 60 can have sub-categories 62 and 64 corresponding to categories indicative of the transport medium employed, such as optic fiber 62 or SCSI (Small Computer System Interface) 64. All categories in the entity model 18 include attribute definitions to which attribute values may be assigned that are related to this category.

Attribute definitions within each entity category in the entity model 18 contain names of attributes (e.g., Disk_Count) but no associated values. In operation of embodiments of the invention, the deployment engine 12 matches the name portion of the attribute values 14 of the new storage array 16n and all of its sub-components, such as its disks, adapters, and the like, to each of the identified categories 50, 52, and 54n, and so forth as will be described in further detail below with respect to FIG. 6 in order to defined which existing categories in the entity model 18 can be used to represent this new storage array by determining which categories have attribute definitions that match the name portion of the attribute values. The corresponding values portion of each attribute value is then assigned to each matching attribute definition, thus populating a data structure in the form of an entity category that can be used to store management data concerning this new manageable entity. That is, the deployment engine 12 generates repository data structures such as tables, files and the like to represent the newly added storage system and further produces component interfaces 40 for each identified category corresponding to the new storage array manageable entity 16n to allow management components such as agents to access these management data structures. Generally then, the software interfaces 40 shown in FIG. 2 represent embodiments of the invention that are able to categorize the set of attributes for a manageable entity into new or existing entity categories within the entity model 18 and are then able to produce software interfaces 40, such as entity object database query interfaces, database table access interface, or any other type of application programming interfaces required to access the various attribute values of the newly classified entity objects (for that new manageable entity).

In another particular arrangement, the manageable entity 15 is a new host such as a server operating in a storage area network. Continuing to refer to FIGS. 1 and 3, the deployment engine 12 identifies the storage area network element category 50 to represent some of the attribute values 14 associated with this new server host, such as a vendor name or host identification (e.g., IP or network address) based in this example embodiment on matching attribute names for this host to attribute definitions in the existing entity categories in the entity model 18. The deployment engine 12 further traverses the model 18 further to identify other matching categories, such as the host category 66, and associates other attribute values for this host to attribute definitions defined in the host category, such as memory capacity, number of processors, and the like. Each host may include includes one or more peripherals, such as disks, that the host devices 68 category can represent, each of which is of a particular vendor device type 70A-70N, shown exemplary as Windows 70A, Unix 70B, and MVS 70C. These attribute values are matched to other attribute definitions in entity model 18.

Each host is further associated with at least one file system 73 and volume group 75. Each volume group 75 represents a logical storage entity that may span several physical volumes including equipment from several different vendors. Accordingly, each volume group includes one or more logical volumes representing physical storage entities, such as disks, files, extents, and segments, which represent a physical partitioning of the included devices in each of the logical volumes.

Figure 13:
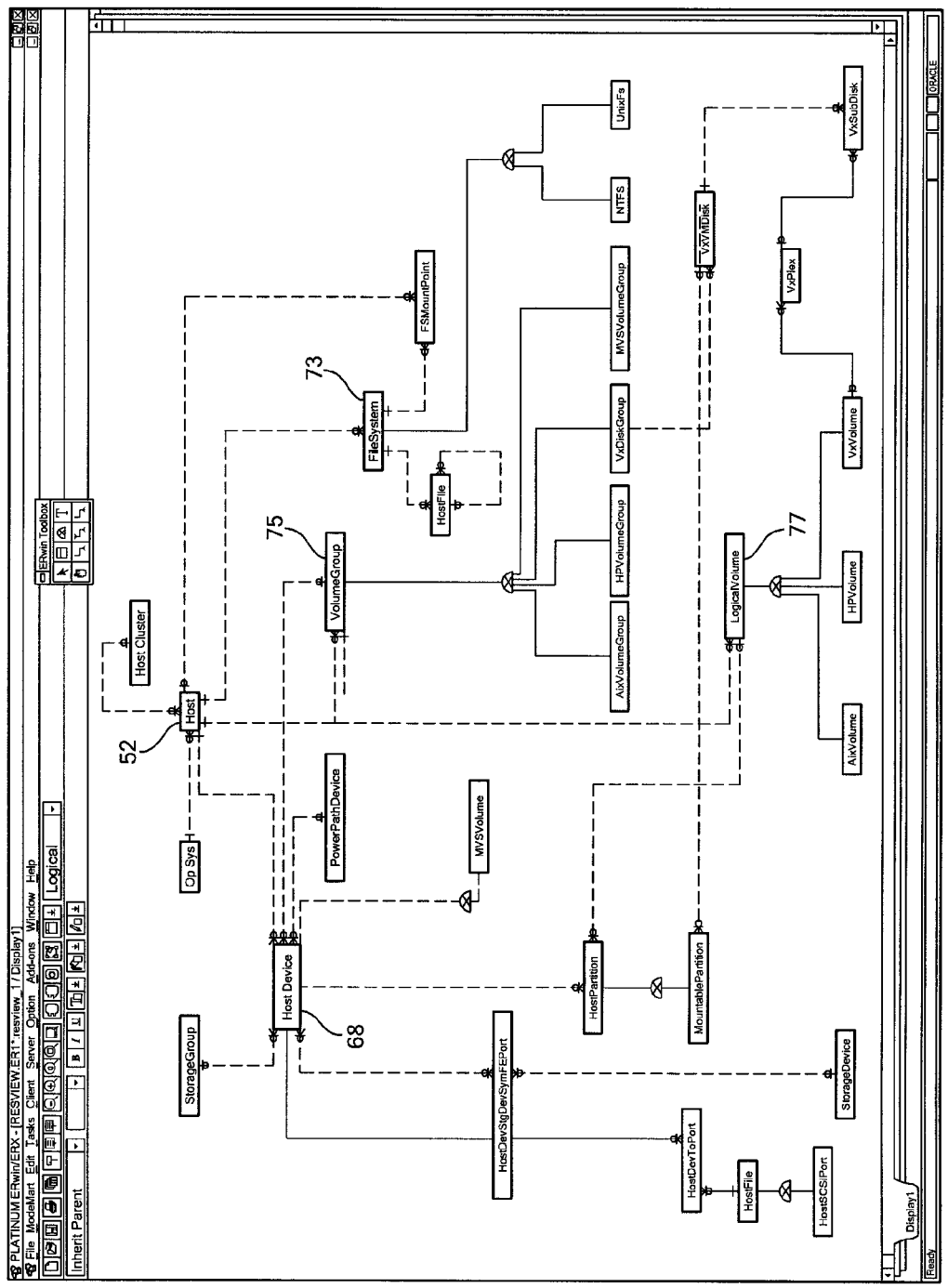
FIG. 13 is an entity relation diagram showing the categories of the host manageable entity of FIG. 7 in greater detail.

This process continues until no attribute values are left to match to attribute definitions or there are no matching attributes definitions for certain attribute values. It should be noted that the host devices 68 category can contain attribute definitions for attribute values relating to such things as the physical disks contained with the host, such as disk drives. It is also to be understood that the example entity model 18 shown in FIG. 3 does not include all entity categories due to drawing space limitations. FIG. 13 below further illustrates a representative superset of available categories. As an example, under each vendor category 70, there may be vendor specific categories for such things as operating systems, vendor specific software, and the like.

The deployment engine 12, in a further configuration, applies a database instance (e.g., a new database program to be deployed in the storage area network) to the entity model 18 using the techniques explained herein) in order to model a new database for management with a storage area network. To do so, the deployment engine 12 identifies a manageable entity of category DB instance 72, within the host 66 category of the storage area network element 50 category. Each DB instance 72 includes one or more logical groups 74, residing in one or more files 76. Each DB instance 72 also corresponds to one or more schema 78, each including one or more DB objects 80, as will be described further below with respect to FIG. 8. In this manner, all sub-categories within the database category hierarchy of the entity model 18 that contain matching attribute definitions can be used to define data structures for use in the repository 36 to represent this new manageable database entity. This example thus illustrates how the DB instance category 72 and related subcategories therefore provide a general model adaptable to a variety of DB vendors, as will be described further below with respect to FIG. 8.

Returning attention now to FIGS. 2 and 3, another alternate configuration allows modeling and deployment of a zone entity within a storage area network. A zone 42 may includes a set of storage arrays 16n and connectivity devices 30n. Though not illustrated in this example, a zone 42 may include host devices 28 or 32 as well. A zone category 55 represents a manageable entity employed to define access control and groups of users that are designated to access a particular subset of the available storage arrays 16n. For example, in a university environment, students may be afforded access on one set of storage arrays 16n (category 52) and connectivity devices 30n (category 63) for academic use, yet denied access to an administrative server or servers for administrative use such as grading and transcripts. The zone 42 is employed to define a group of faculty which have access to the administrative zone.

Referring again to FIGS. 1 and 2, the entity model 18 defines an extensible and adaptive framework in which to deploy new manageable entities into a storage area network 24 or other computer network under management of a common network management application 38. The deployment process may be automated, manual, or a combination of automatic and manual operations. Typically, software interfaces 40 are produced from the deployment engine 12 and classification processor 20, wherein a component 40 represents a discrete deployable software unit, as described above.

The entity model 18 therefore reduces deployment time through component reuse because components 40 corresponding to existing categories generally will integrate seamlessly into the storage area network 24 and mitigate regressive test effort requirements. A heterogeneous storage area network 24 entity arrangement may be built and extended since the added entities conform to existing categories represented by the model 18, or can be added with only the addition of device-specific categories and attributes to the model 18. In this manner, deployment of manageable entities according to the model achieves improved time-to-market results for new manageable entities, such as storage arrays, hosts, and databases.

Further, the entity model 18 disclosed herein may be adapted for other applications in which a configuration baseline or other predetermined parameter structure is enforced. It will be apparent to those skilled in the art that a manageable entity may be, in particular arrangements, hardware, software, firmware, middleware, or other medium, and that the entity model includes categories and attributes that may be applied to a heterogeneous set of such manageable entities. By defining categories applicable generally to types of entities, and by defining attributes within the categories that define entity specific characteristics for each manageable entity, the entity model operates to define an adaptive and extensible deployment and modification template.

Figure 4:
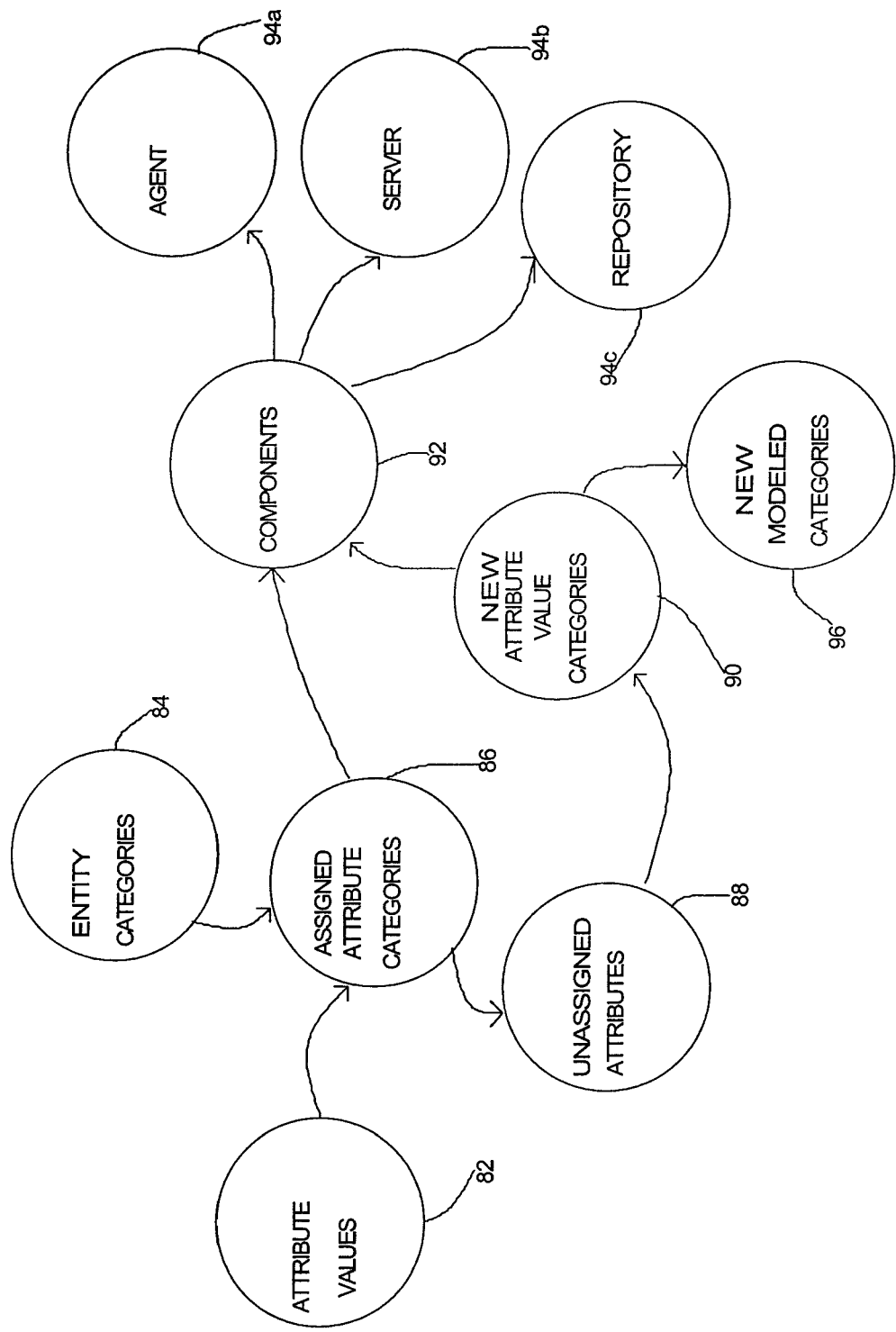
FIG. 4 shows a dataflow of deployment of a manageable entity in accordance with one embodiment of the invention.

FIG. 4 shows a data flow diagram for deployment of a manageable entity 15 according to the entity model 18 shown in FIG. 3 in accordance with one embodiment of the invention. Referring to FIGS. 1, 3 and 4, a manageable entity 15 has a set of attribute values 82. The entity model 18 has entity categories 84 and the attribute definitions included within the categories. The attribute values assigned, or matched, with attribute definitions produces assigned attribute categories 86. The attribute values 82 for which no corresponding attribute definition was found generate unassigned attributes 88.

The unassigned attributes 88 are employed to generate new attribute value categories 90, to include the new attribute values. Alternatively, the new attribute values may be appended to existing categories. The categories including the assigned attribute categories 88 and the new attribute value categories 90 result in production of software interfaces 92 used for deployment on the manageable entities. The software interfaces 92 (40 in FIGS. 1 and 2) are deployed as agent components 94a on the host 28 (e.g., interfaces used by agent software to access the managed objects modeled by the invention), server components 94b on the infrastructure servers 32n, and repository servers 94c on the repository 36. The entity model 18 also receives the new modeled software interface categories 96 created for the new attributes to enable updates to the model 18 to reflect the new attributes for subsequent entity deployment.

Figure 5:
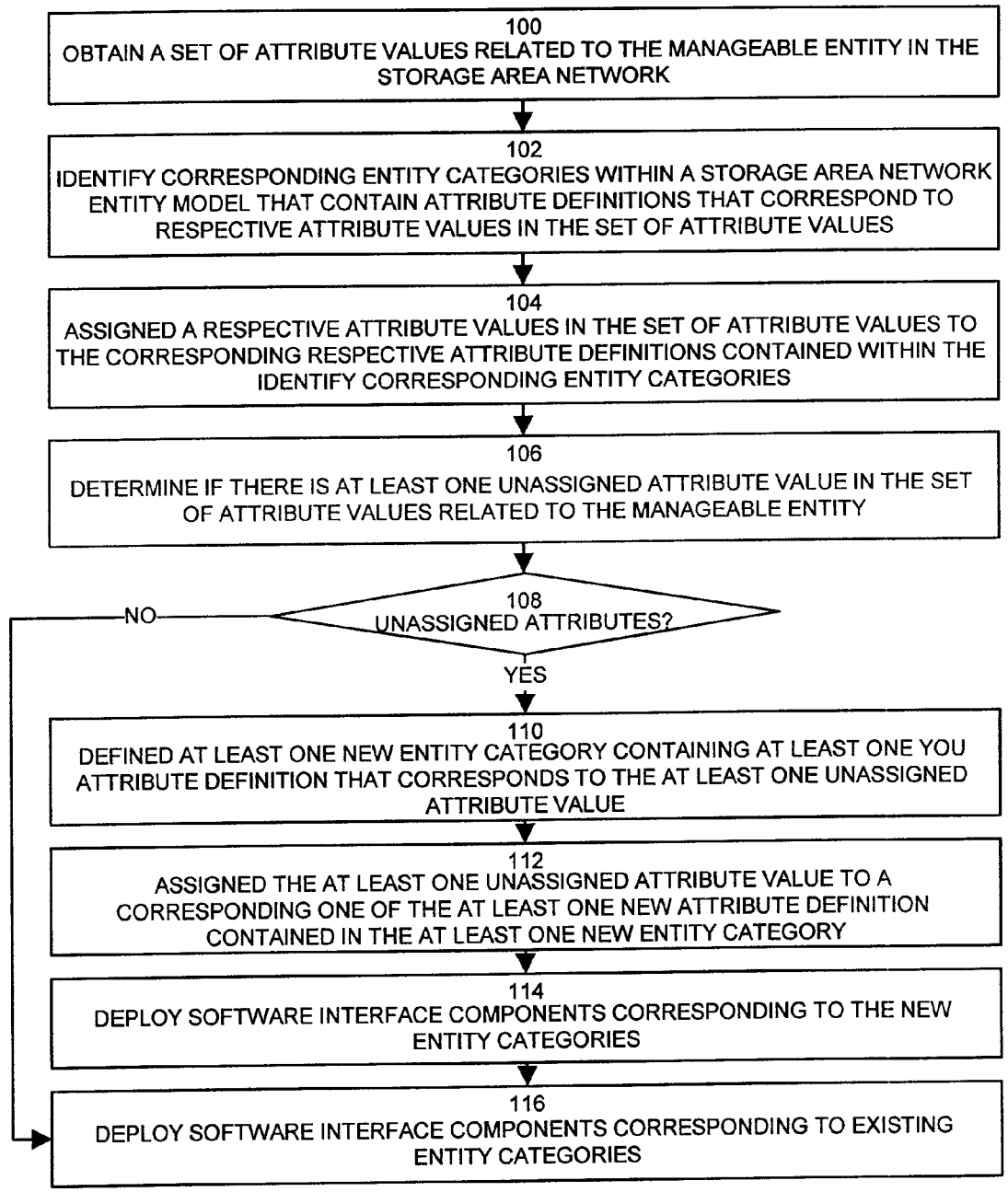
FIG. 5 shows a flowchart of deployment of a manageable entity corresponding to the model of FIG. 3 in accordance with one embodiment of the invention.

FIG. 5 shows a flowchart of deployment of a manageable entity corresponding to the model of FIG. 3.

In step 100, referring to FIGS. 1, 3 and 5, the deployment engine 12 obtains a set of attribute values 14 related to the manageable entity 15 in the storage area network.

In step 102, the deployment engine 12 identifies corresponding entity categories within the storage area network entity model 18 that contain attribute definitions corresponding to respective attribute values in the set of attribute values 14.

In step 104, the deployment engine 12 assigns the respective attribute values in the set of attribute values to the corresponding respective attribute definitions contained within the identified corresponding entity categories. Therefore, the deployment engine 12 attempts to match each attribute value 14 of the new manageable entity 15 to an existing attribute in the model 18.

In step 106, the deployment engine 12 then determines if there are any attribute values remaining unassigned in the set of attribute values 14 related to the manageable entity 15.

If there are unassigned attributes, as determined by the check performed at step 108, then the classification processor 20 receives the unassigned attributes.

In step 110, the classification processor 20 defines new entity categories containing the new attribute definitions that correspond to the unassigned attribute values. The classification processor 20 is operable to traverse the model 18 and determine an appropriate relation for the new entity category and associated attributes, such as by matching attribute value name to attribute names defined in attribute definitions. Alternatively, the new attributes 14 may be appended to a category to yield a new category based on the existing category if many attributes of a new device match, but some do not match exactly, but share a common naming scheme.

Next, in step 112, the classification processor 20 then assigns the unassigned attribute value to the corresponding new attribute definition contained in the new entity category.

In step 114, the classification processor 20 deploys components corresponding to the new categories and attributes.

Next, in step 116, continuing from step 108 above, in either case the deployment engine 12 then deploys components corresponding to existing entity categories for the new manageable entity 15 onto the deployment storage area network 24.

Figure 6:
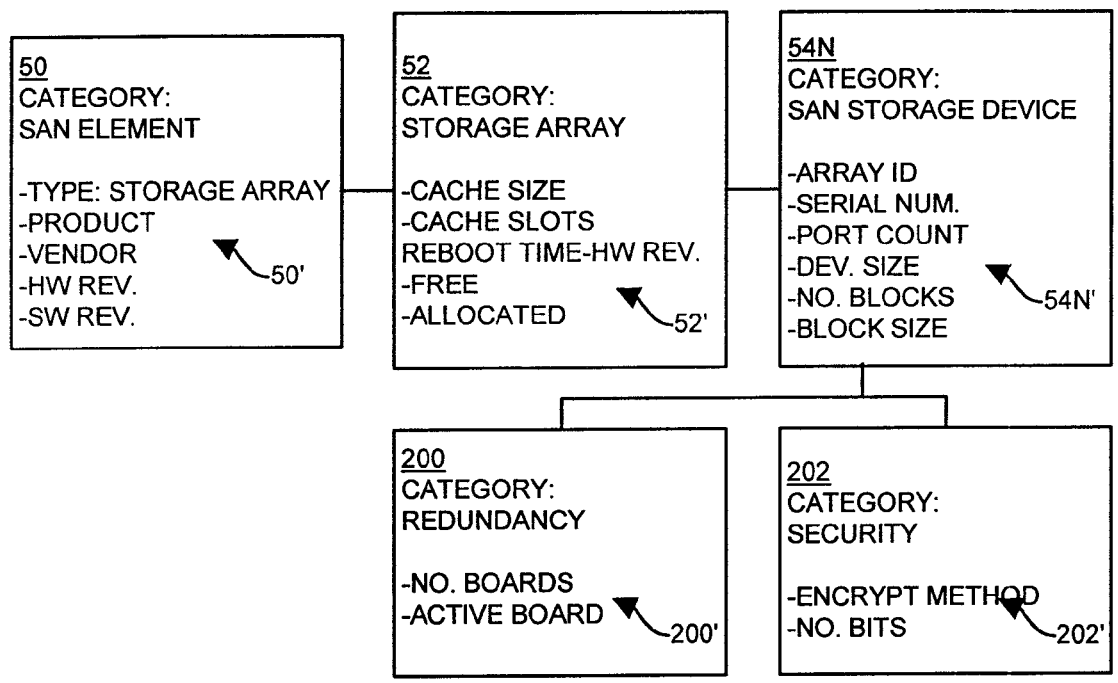
FIG. 6 shows an example of creating categories and attribute definitions concerned with deployment of a storage array manageable entity in accordance with one embodiment of the invention.

FIG. 6 shows an example of manageable entity deployment for a storage array. Referring to FIG. 6 and FIGS. 1, 2 and 3, a new storage array is identified as a storage area network element 50. Traversing the model 18 further, the deployment engine 12 identifies the manageable entity 15 as a storage array 52 from XYZ computer corp., and being of storage device type 54N. The deployment engine 12 identifies the attribute values supplied with the new storage array 15, and assigns the values to corresponding attribute definitions 50', 52' and 54N'. However, this storage array is a new fault tolerant, secure milspec model from XYZ with encryption hardware. Accordingly, attribute values "No. Boards" and "Active Board," covering the fault tolerant feature, and attribute values "Encrypt Method" and "No. Bits," covering the encryption feature, remain unassigned (i.e., do not have matching attribute definitions). The classification processor 20 receives the unassigned attribute values to classify them into categories. The classification processor 20 creates entity categories 200 for redundancy, and category 202 for security, in the entity model 18.

Within the redundancy category 200, attribute definitions 200' are created for No. Boards and Active Board, and assigned values "2" and "1" respectively, and within the security category 202, attribute definitions 202' are created for Encrypt Method and No. Bits and assigned "RSA Public Key" and "1024" respectively.

Figure 7:
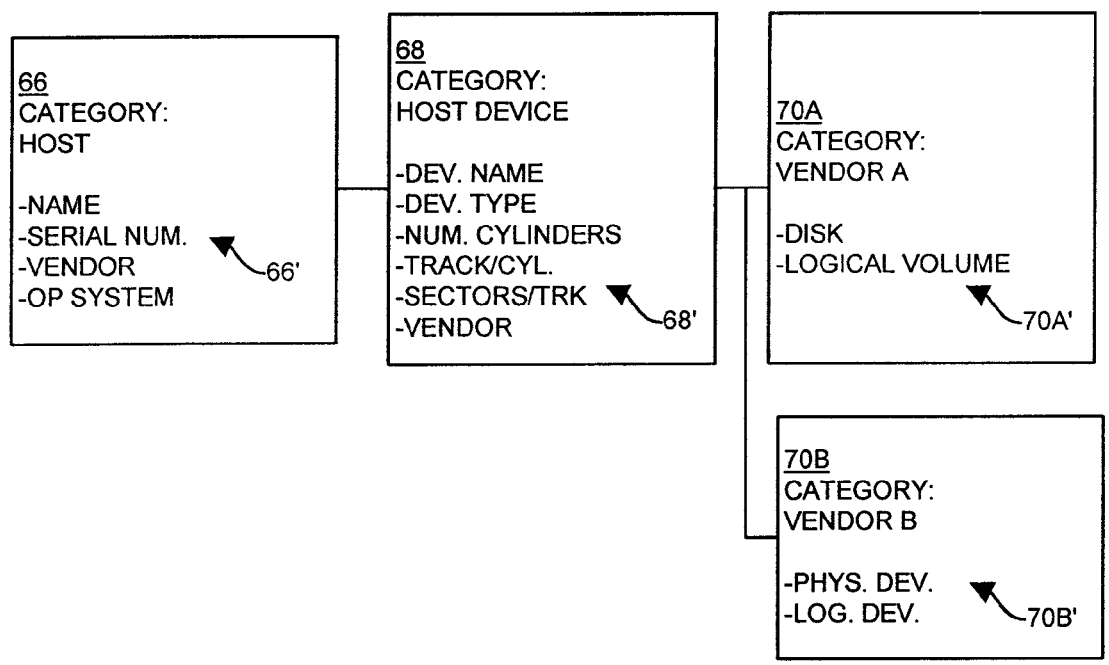
FIG. 7 shows an example of attributes concerned with deployment of a host manageable entity in accordance with one embodiment of the invention.

FIG. 7 shows an example of the attribute definitions for categories in the host entity. Referring to FIG. 7, the host category 66 includes the attribute definitions 60.' The host category 66 includes a host device category 68 with attribute definitions 68.' However, as multiple types of host devices from a variety of vendors may be accessible from the host, the host category has vendor type categories 70a-70N (70n generally). Specifically, vendor type 1 category 70a includes attributes 70a' (Disk and Logical Volume), while vendor type 2 category 70b includes attributes 70b' (Physical Device and Logical Device). In this manner, a host may access a heterogeneous arrangement of host devices from a variety of vendors, and may add additional host devices via the entity model 18.

Figure 8:
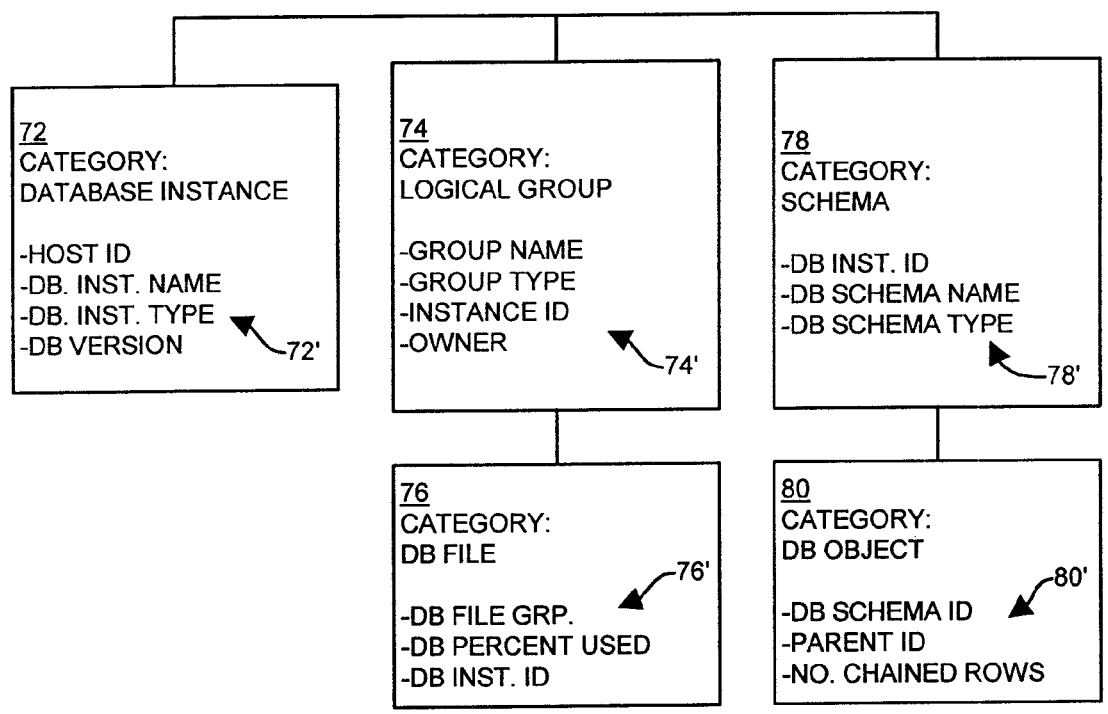
FIG. 8 shows an example of attributes concerned with deployment of a database manageable entity in accordance with one embodiment of the invention.

FIG. 8 shows an example of a database (DB) instance. Referring to FIG. 8, the DB Instance category 72 includes attribute definitions 72.' Each DB Instance 72 has zero or more logical groups 74, including attributes 74', each of which includes zero or more DB files 76, including attributes 76.' Further, each DB instance 72 also has zero or more schemas 78 having attributes 78,' each of which includes zero or more DB objects 80 with attributes 80.'

Figure 9:
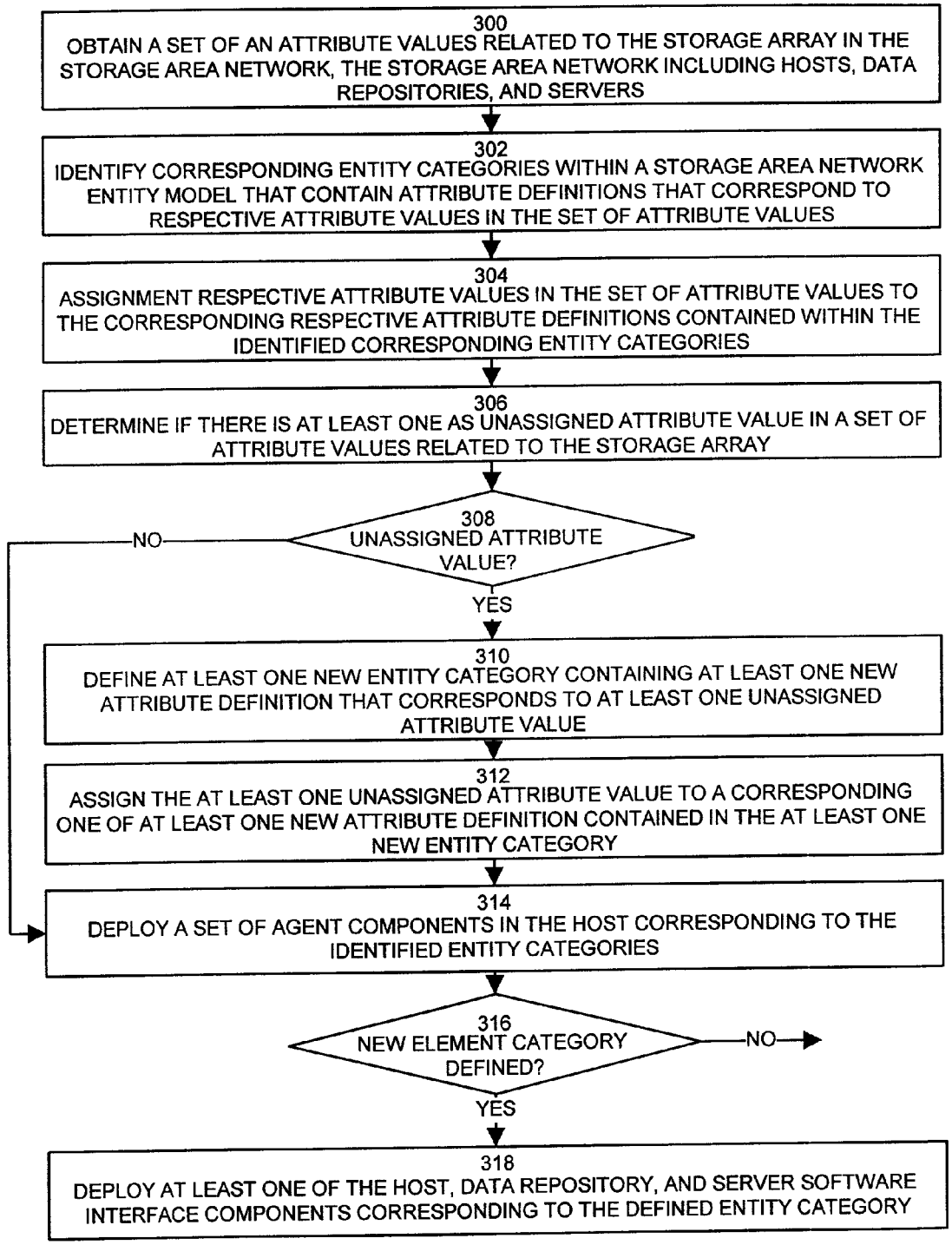
FIG. 9 shows a flowchart corresponding to deployment of a storage array manageable entity in accordance with one embodiment of the invention.

FIG. 9 shows a flow chart of processing operations corresponding to deployment of a storage array manageable entity in accordance with one embodiment of the invention.

In step 300, referring to FIGS. 9 and 1, the deployment engine 12 obtains a set of attribute values related to the storage array in the storage area network.

In step 302, The deployment engine 12 identifies corresponding entity categories within the storage area network entity model 18 that contain attribute definitions that correspond to respective attribute values in the set of attribute values.

In step 304, the deployment engine 12 assigns the respective attribute values to the corresponding respective attribute definitions contained within the identified entity categories.

In step 306, the deployment engine 12 then determines if there are any unassigned attribute values in the set of attribute values 14 related to the storage array, and performs a check accordingly, as shown at step 308.

In step 310, if there are unassigned attribute values, the classification processor 20 defines new entity categories containing the new attribute definitions that correspond to the unassigned attribute value and then assigns the unassigned attribute value to the corresponding new attribute definitions, as disclosed at step 312.

In step 314, in either case of step 308, a set of agent components corresponding to the identified and the new entity categories for the new storage array is deployed in the host.

Next, a check is performed, as shown at step 316, to determine if a new entity category was defined. If a new entity category was defined, in at least one of the host, data repositories, and servers, then in step 318 the deployment engine 12 deploys components corresponding to the defined entity category.

In step 316, if no new entity categories were defined, then only a new agent component is deployed on the host, because the new storage array conforms to the entity model, and existing server and database components are employed for operations with the new component.

Figure 10:
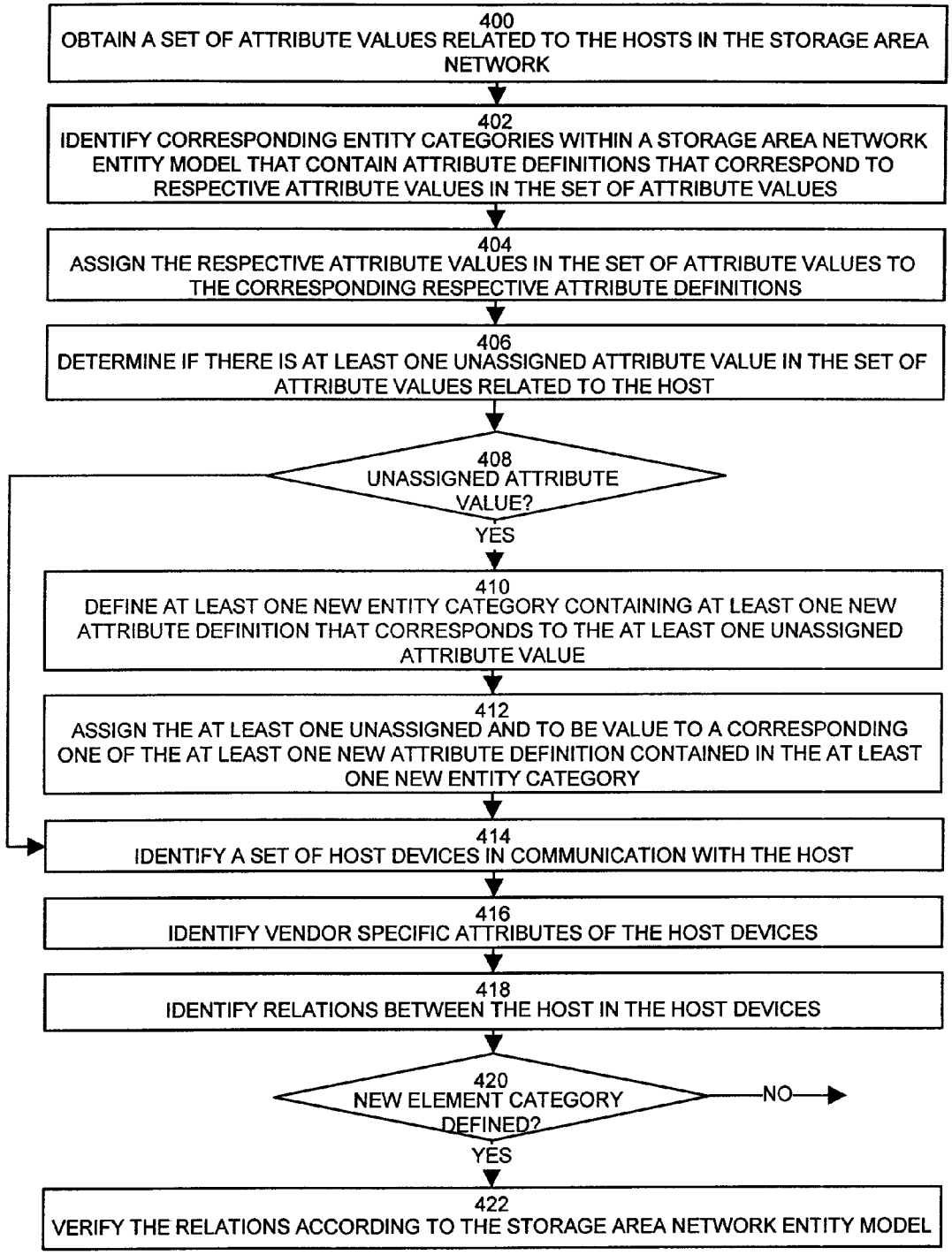
FIG. 10 shows a flowchart corresponding to deployment of a host manageable entity in accordance with one embodiment of the invention.

FIG. 10 shows a flow chart of processing operations corresponding to deployment of a host manageable entity according to one embodiment of the invention.

In step 400, referring to FIGS. 1 and 10, the deployment engine 12 obtains a set of attribute values related to the host.

In step 402, corresponding entity categories are identified within the storage area network entity model 18.

Next, in step 404, the deployment engine 12 assigns the respective attribute values to the corresponding respective attribute definitions.

In step 406, the deployment engine 12 then determines if there are any unassigned attribute values in the set of attribute values 14 related to the host, and performs a check accordingly, as shown at step 408.

In step 410, if there are unassigned attribute values, the classification processor 20 defines new entity categories containing the new attribute definitions that correspond to the unassigned attribute value, and assigns the unassigned attribute value to the corresponding new attribute definitions, as disclosed at step 412.

In either case of step 408, whether new attribute definitions were created or not, in step 414 the deployment engine 12 identifies a set of host devices in communication with the host.

In step 416, the deployment engine 12 identifies vendor specific attributes of the host devices.

Employing the entity model 18, in step 418 the deployment engine 12 identifies relations between the host and the host devices, which may be of heterogeneous device types 70a-70N

In step 420, a check is performed to determine if new entity categories were defined, and if so, the relations are verified according to the model 18 to ensure adherence to the model 18, as depicted at step 422.

Figure 11:
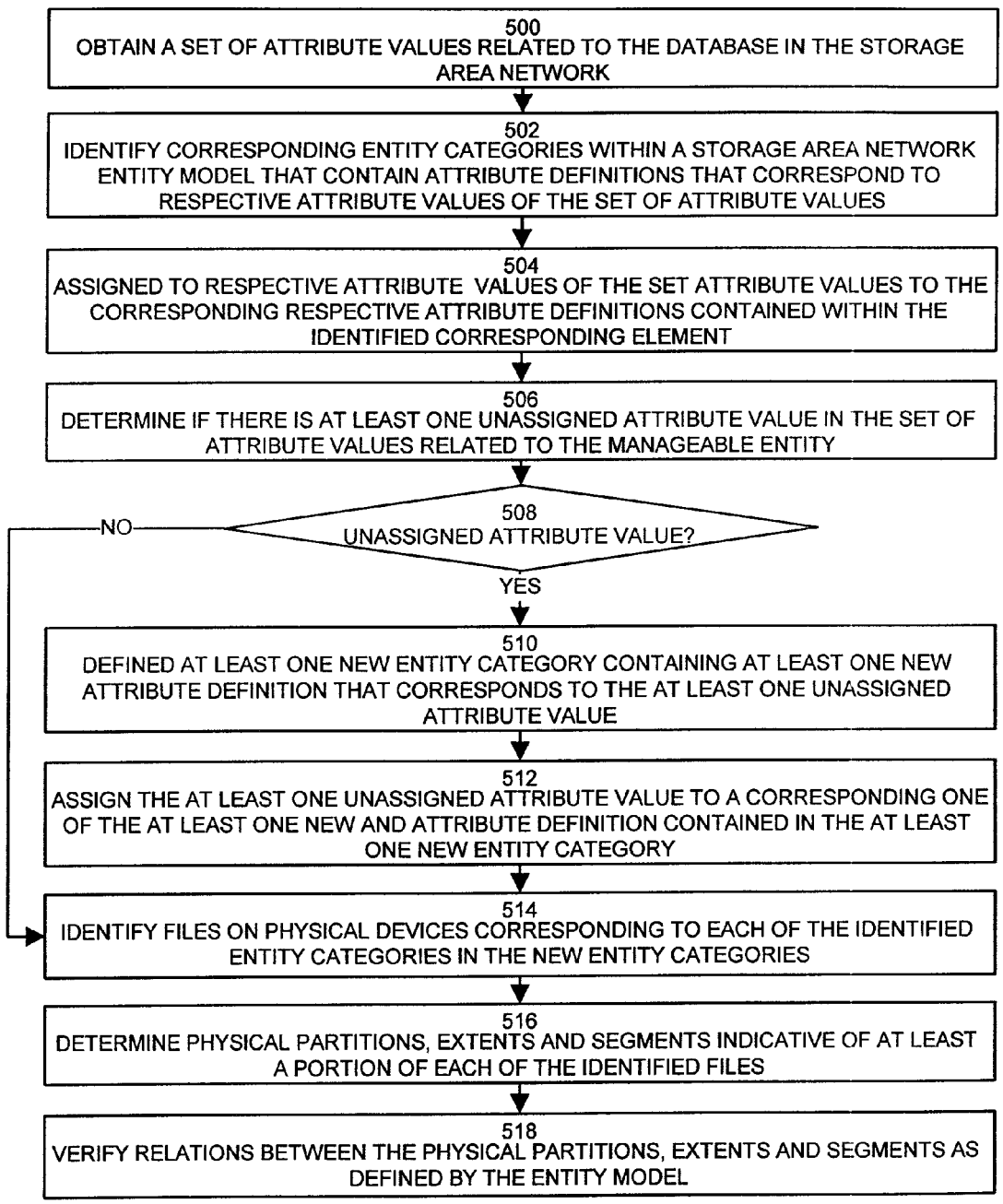
FIG. 11 shows a flowchart corresponding to deployment of a database manageable entity in accordance with one embodiment of the invention.

FIG. 11 shows a flow chart corresponding to deployment of a database manageable entity according to one embodiment of the invention.

In step 500, referring to FIGS. 1 and 11, the deployment engine 12 obtains a set of attribute values related to the database 72.

In step 502, the deployment engine 12 identifies corresponding entity categories within the model 18.

Next, in step 504 the deployment engine 12 assigns the respective attribute values to the corresponding attribute definitions.

In step 506, the deployment engine 12 then determines if there are any unassigned attribute values in the set of attribute values 14 related to the database, as depicted at step 506, and performs a check accordingly, as shown at step 508.

In step 510, if there are unassigned attribute values, the classification processor 20 defines new entity categories containing the new attribute definitions that correspond to the unassigned attribute values.

In step 512, the classification processor 20 assigns the unassigned attribute values to the corresponding new attribute definitions.

In step 514, the deployment engine 12, employing the existing and new categories, identifies files on physical devices corresponding to each of the identified entity categories and the new entity categories.

In step 516, the deployment engine 12 determines physical partitions, extents, and segments indicative of at least a portion of each of the identified files.

Finally, in step 518 the classification processor 20 verifies the relations between the physical partitions, extents, and segments as defined by the model 18 and entity categories logical group 74, file 76, schema 78, and DB object 80.

Figure 12:
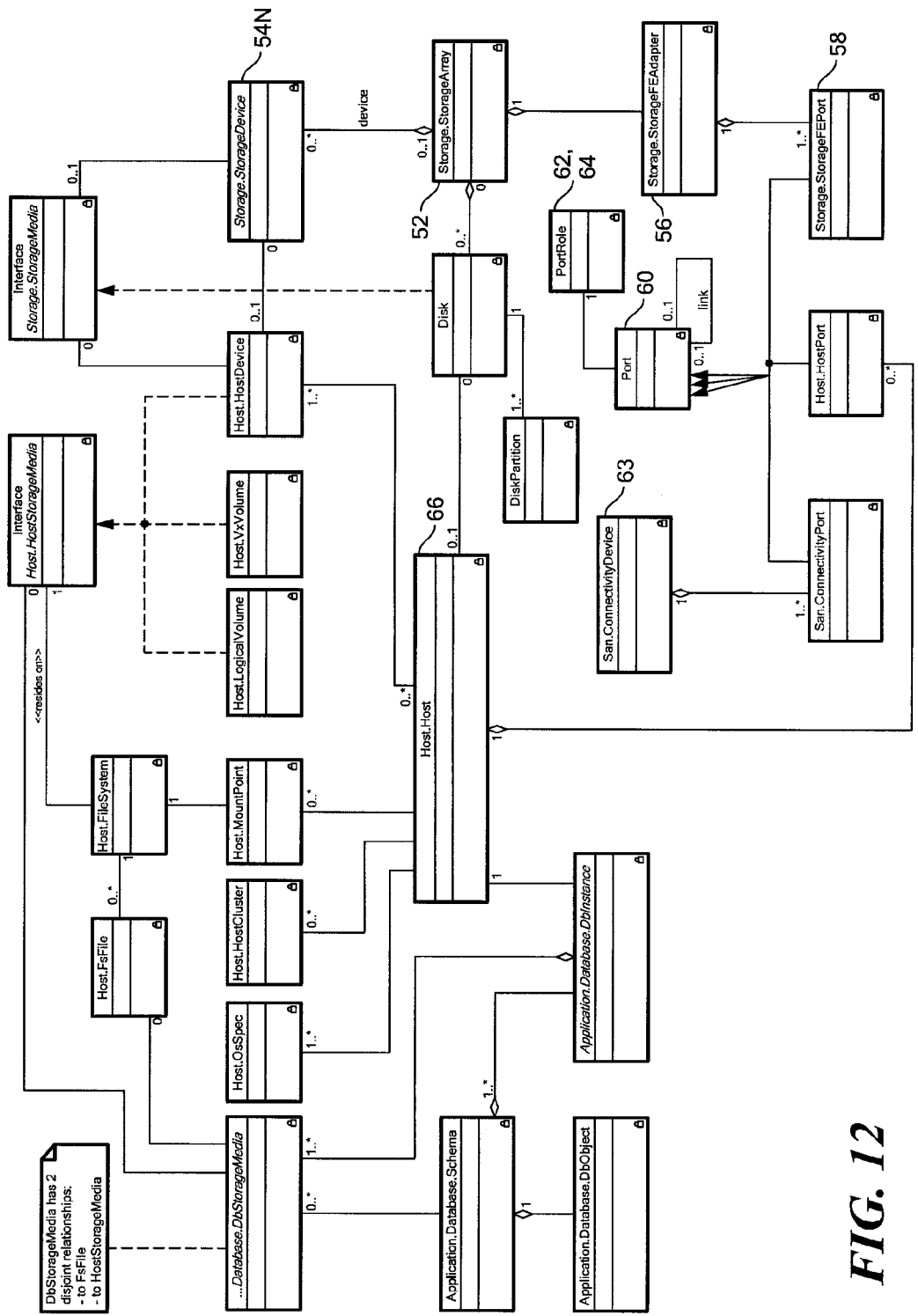
FIG. 12 is an entity relation diagram showing the categories of the storage array manageable entity of FIG. 6 in greater detail.
Figure 14:
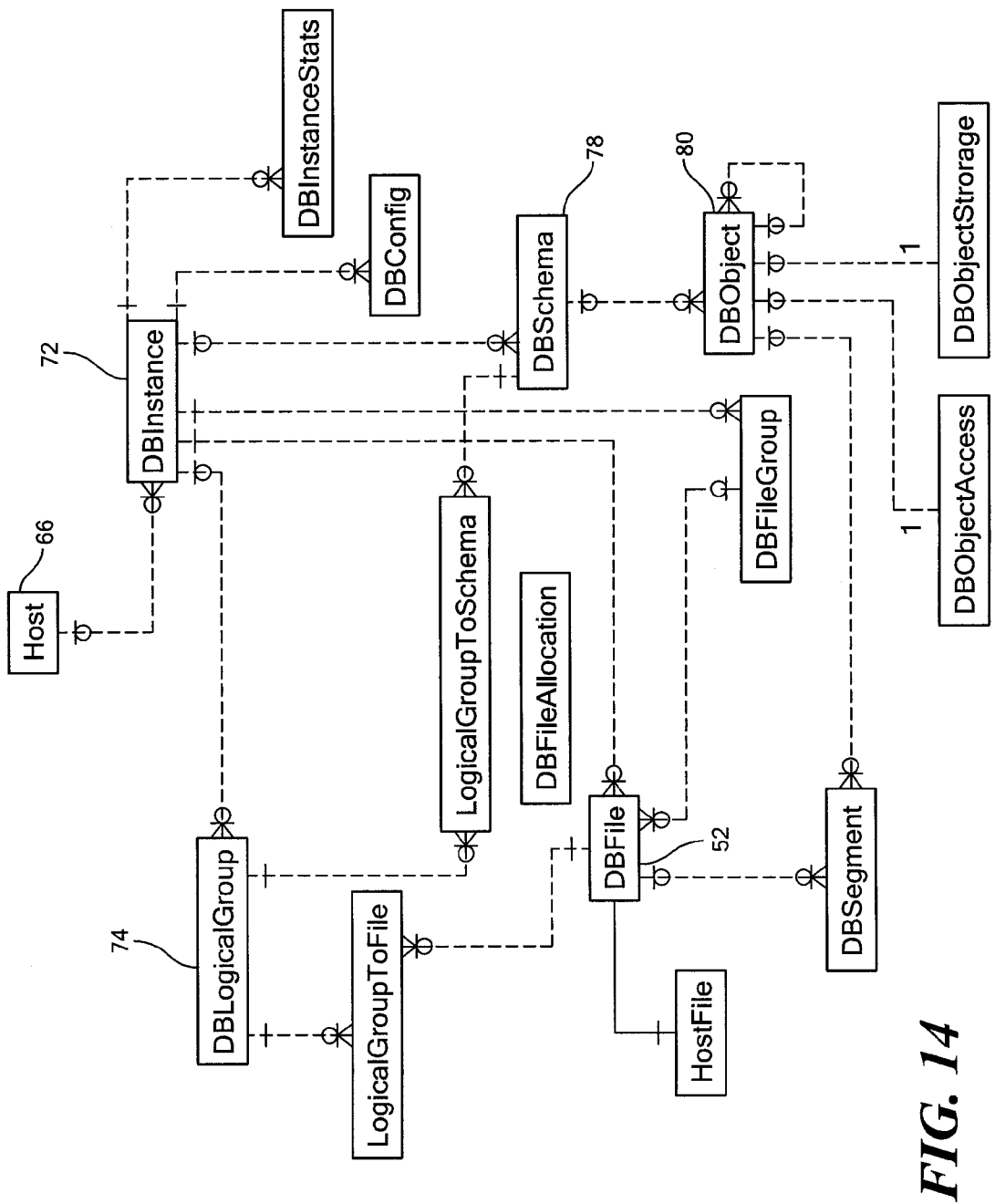
FIG. 14 is an entity relation diagram showing the categories of the database manageable entity of FIG. 8 in greater detail.

FIGS. 12-14 are entity-relation (ER) diagrams of the categories specific to each of the several types of manageable entities described above, specifically storage arrays, hosts, and databases. Each of these diagrams further illustrates additional categories that the model 18 employs to deploy new manageable entities. Further, each of these categories includes additional attributes (not shown) which are specific to the category in question.

FIG. 12 is an entity relation diagram showing the categories of the storage array manageable entity of FIG. 6 in greater detail. Referring to FIGS. 12 and 3, in alternate configurations, additional fields in the model may be employed to more fully characterize the categories and attributes employed by a SAN element 50, along with the interrelationships between the categories (entities). FIG. 12 is a graphical representation generated by an entity parsing and processing tool indicative of the categories and attributes employed in a model, and shows an extension of the categories employed in the configuration in FIG. 3. Not all configurations need employ all categories and relations shown.

FIG. 13 is an entity relation diagram showing the categories of the host manageable entity of FIG. 7 in greater detail. Similar to FIG. 12, FIG. 13 is a graphical representation of a superset of the categories shown in FIG. 3 for host 66 manageable entities. Not all configurations need support all categories and relations shown.

FIG. 14 is an entity relation diagram showing the categories of the database manageable entity of FIG. 8 in greater detail. Referring to FIG. 14, an extension of the categories and relations of FIG. 3 specific to database manageable entities is shown. Not all configurations need support all categories and relations shown.

The model extensions shown in FIGS. 12-14 are extensions to the model shown in the configuration illustrated in FIG. 3. In particular configurations, the model may be employed in more general or more specific manner to suit the categories and attributes that are to be employed to deploy a particular device. In a smaller scope system, a general model may not need to employ all the categories and attributes shown to be a workable representation of expected attributes of deployable entities. In a more complex configuration that expects a multitude of different manageable entities, each requiring a robust set of available categories and attributes, a more detailed model is applicable, having appropriate categories and attributes to receive the possible attribute values from the expected manageable entities. The entity model as disclosed and claimed herein is intended to be a workable model adaptable to a broad range of deployment environments, and, accordingly, the model is not intended to be limited except as described in the claims.

The entity model 18, therefore, defines a known database instance structure indicative of files, extents, and segments on a physical device (disk or CDROM). Conformance to this entity model 18 ensures that new entities will respond appropriately to the network management application with respect to logical volumes, logical devices, and other access formats that may differ between devices and vendors. In this manner, a heterogeneous arrangement of databases is enabled in communication with a common host 28, and the model 18 is extensible to additional databases that conform to the existing or created categories.

Those skilled in the art should readily appreciate that the programs defining manageable entity deployment as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for defining manageable entities has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer program product, stored on a non-transitory computer readable storage medium, having a data structure stored thereon for adaptive storage element deployment in a storage area network, the data structure comprising:
    attributes having associated attribute values of an object to be deployed in the network, the attribute values indicative of network characteristics of the object;
    identified attribute definitions in a predetermined set of top level objects adapted to be compared to the attributes of the object to be deployed to determine a matching top level object, each of the top level objects in the set of top level objects having an entity category, matching top level objects being in the same entity category and sharing an attribute definition;
    successive attributes corresponding to the matching top level object and indicative of matching object generic attributes corresponding to matching attributes of the object to be added, the successive attributes defining a plurality of levels, the data structure adapted to receive attribute values for entity categories at successive levels;
    object specific attribute definitions corresponding to the unmatching attributes adapted to be defined and classified for creating attribute definitions in the data structure corresponding to the unmatching attributes; and
    object generic attribute definitions adapted to receive the associated attribute values corresponding to the object to be deployed, the attribute definitions for receiving attribute value pairs indicative of the attribute definition and corresponding attribute value, and the successive ancillary attributes defining a plurality of level, the data structure adapted to receive attribute values for entity categories at successive levels of the plurality of levels.

2. The computer program product of claim 1 wherein the attribute definitions are for receiving attribute value pairs indicative of the attribute definition and corresponding attribute value.

3. The computer program product of claim 2 wherein the attribute value pairs are further indicative of the corresponding entity category for each of the particular attribute value defined in the attribute value pair.

4. The computer program product of claim 1 wherein the object to be deployed is a manageable entity in a storage area network, the manageable entity having an element specification file indicative of object specific attribute definitions.

5. The computer program product of claim 4 wherein the data structure is adapted to receive an element specification file corresponding to the manageable entity to be defined and operable to be parsed for defining the new entity category and corresponding attributes.

6. The computer program product of claim 1 wherein the data structure is responsive to an agent component corresponding to the defined new entity category, such that the agent components corresponding an existing entity category are predefined.

7. The computer program product of claim 6 wherein the object to be deployed is a connectivity device in a storage area network, the connectivity device operable to provide connectivity between a set of storage arrays and an infrastructure server for accessing data in the storage array.

8. The computer program product of claim 6 wherein the object to be deployed is a manageable entity in a storage area network, the manageable entity responsive to a corresponding agent for monitoring and controlling the manageable entity.

9. The computer program product of claim 8 wherein the manageable entity is a zone, the zone indicative of a subset of the manageable entities in the storage area network and adapted to provide selective access control to the manageable entities in the zone.

10. The computer program product of claim 8 wherein the manageable entity is a database and assigning the respective attribute values further comprises assigning attribute values including at least one of vendor, instance type of DB, owner, group, schema characteristics, and DB object characteristics.

11. The computer program product of claim 8 wherein the manageable entity is a host in communication with a set of other storage area network element and assigning the respective attribute values further comprises assigning attribute values including at least one of operating system, IP address, file server, host device characteristics, agent components, and storage arrays.

12. A method of component reuse in a storage area network defined by a model of entity category templates, each entity category corresponding to a component, comprising:
    identifying a top-level entity category corresponding to a network element to be deployed, each entity category having an attribute definition including attributes common to components in that entity category;
    identifying, for each of a set of successive levels in the model from the identified top-level category, ancillary categories corresponding to the attributes of the network element to be deployed;
    defining, for each of the attributes corresponding to an identified category, attribute values derived from an instantiation of an existing component in the same entity category as the network element to be deployed; and
    repeating the identifying and defining in an iterative manner for the ancillary categories at successive levels of the model of entity category templates.

13. The method of claim 12 further comprising:
    determining if there is at least one unassigned attribute value in the attribute values of the network element to be deployed, and if so:

defining at least one new entity category containing at least one new attribute definition that corresponds to the at least one unassigned attribute value.

14. The method of claim 13 further comprising assigning the at least one unassigned attribute value to a corresponding one of the at least one new attribute definition contained in the at least one new entity category.

15. The method of claim 13 wherein the defining further comprises:
    creating, for each of the unassigned attribute values, an attribute definition; and
    storing, in the created attribute definition, the unassigned attribute value.

16. The method of claim 15 wherein the step of determining further comprises parsing an element specification file corresponding to the network element to be defined, the network element being a storage area network element further comprising at least one of a subtype, the subtypes including storage array, host, or connectivity device, and identifying the corresponding entity category includes determining the subtype of storage area network element.

17. The method of claim 12 wherein the step of identifying further comprises:
    traversing a hierarchical structure having levels defined by the entity categories of the model of entity categories; and
    iteratively comparing, at each successive level of the hierarchical structure, the unassigned attribute values to the attribute definitions in the entity categories at that level of the hierarchy.

18. A computer program product including computer program code embodied as a set of instructions on a computer readable storage medium that, when executed by a computer responsive to the instructions cases the computer to perform steps for invoking a data structure for adaptive storage element deployment in a storage area network comprising:

computer program code for defining attributes having associated attribute values of an object to be deployed in the network, the attribute values indicative of network characteristics of the object;

computer program code for identifying attribute definitions in a predetermined set of top level objects adapted to be compared to the attributes of the object to be deployed to determine a matching top level object, each of the top level objects in the set of top level objects having an entity category, matching top level objects being in the same entity category and sharing an attribute definition;

computer program code for defining successive attributes corresponding to the matching top level object and indicative of matching object generic attributes corresponding to matching attributes of the object to be added, the successive attributes defining a plurality of levels, the data structure adapted to receive attribute values for entity categories at successive levels;

computer program code for defining object specific attribute definitions corresponding to the unmatching attributes adapted to be defined and classified for creating attribute definitions in the data structure corresponding to the unmatching attributes; and computer program code for defining object generic attribute definitions adapted to receive the associated attribute values corresponding to the object to be deployed, the attribute definitions for receiving attribute value pairs indicative of the attribute definition and corresponding attribute value, and the successive ancillary attributes defining a plurality of levels, the data structure adapted to receive attribute values for entity categories at successive levels of the plurality of levels.

* * * * *